United States Patent Office 3,347,845
Patented Oct. 17, 1967

3,347,845
SHOCK STABLE AZODIFORMATE ESTERS
Chester S. Sheppard, Kenmore, H. Norman Schack, Buffalo, and Orville L. Mageli, Kenmore, N.Y., assignors to Wallace and Tiernan Inc., Buffalo, N.Y., a corporation of Delaware
No Drawing. Filed Dec. 9, 1963, Ser. No. 329,301
7 Claims. (Cl. 260—192)

ABSTRACT OF THE DISCLOSURE

A shock stable solution of certain azodiformates and inert organic liquid solvents. Example: Dimethylazodiformate, 38%; dioctyl phthalate, 62%.

---

This is a continuation-in-part of our copending applications Ser. Nos. 299,152 and 299,161, filed Aug. 1, 1963, and both now abandoned.

This invention relates to certain esters of azodiformic acid. More particularly, it relates to compositions including these esters which are shock stable.

It is know that certain diesters of azodiformic acid (azodicarboxylic acid) are blowing agents for foaming polymers. It has been discovered, and this is disclosed in the above listed parent applications, that the blowing effectiveness of esters of azodiformic acid can be enhanced by the presence of an activating agent—a metallic compound having unneutralized Lewis acid properties. This defined ester-activator combination is of value in the production of foamed polymeric bodies, either thermoplastic or thermosetting polymers. Illustrative polymers include: the polyolefins such as polyethylene, polypropylene, synthetic rubber and natural rubbers; the vinyl halides, such as polyvinyl chloride, and the copolymers such as vinyl chloride-vinyl acetate; the vinyl esters such as polyvinyl acetate; the cellulose esters, such as cellulose acetate, cellulose acetate butyrate; the cellulose ethers such as methyl cellulose; the silicone gums and rubbers; the nitrile rubbers; the polyesters, saturated or unsaturated aliphatic and aromatic; the polyethers; the polyamides; the polyurethanes; the phenolic resins; and the epoxy resins. Any polymer may be foamed whose viscosity characteristics at the blowing temperature permit the expansion of the melt or the retention of the released gas.

The gas release efficiency per unit weight of these azodiformates is best with the lower molecular ester groups, such as dimethyl azodiformate and diethyl azodiformate. However, it has been discovered that these azodiformates are shock sensitive to a degree which probably bars them from use in commerce as blowing agents.

It has been discovered that an intimate mixture of a shock stable material, either liquid or solid, and a normally shock sensitive ester of azodiformic acid, in the proper proportions of material and ester, is shock stable to a degree permitting use as a "non-hazardous" polymer blowing agent. The ester group is either methyl, ethyl, allyl, halomethyl, alkylene oxyalkylene, thioalkylene where said alkylene groups have 2-4 carbon atoms. The diester may be a simple azodiformate, or an ester group bridged bis azodiformate, or a polyester having three or more repeating "azo" units.

The terms "shock sensitive" and "shock stable" are used herein relative to the standard dropping weight and lead pipe deformation tests described by Noller and Bolton, "Analytical Chemistry," 35, 889 (1963). Briefly, in the LPD test, 10 grams of test material are placed in a glass tube, a No. 6 electrical blasting cap positioned in the material, the tube is placed in a close fitting lead pipe and the cap is detonated. The condition of the pipe determines the classification of the material.

The azodiformates which come within the scope of this invention are diesters of azodiformic acid or realistically, diesters containing the

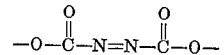

difunctional group.

(a) The diesters present in the composition of the invention may be the simple diesters of azodiformic acid having the formula:

(I)

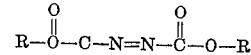

where R is an "ester group" from the class of methyl, ethyl, allyl, or halomethyl. Illustrative simple diesters are dimethyl azodiformate; diethyl azodiformate; and diallyl azodiformate.

(b) The diesters include two "azo" groups bridged by a difunctional ester group from the class of alkylene, oxyalkylene, thioalkylene, where these alkylene groups have 2, 3 or 4 carbon atoms. Illustrative groups are ethylene (—$CH_2CH_2$—); propylene (—$CH_2CH_2CH_2$—); n-butylene; oxydiethylene (—$CH_2CH_2$—O—$CH_2CH_2$—; and thiodiethylene (—$CH_2CH_2$—S—$CH_2CH_2$—). This class of the diesters which come within the scope of the invention is illustrated by ethylene bis(methylazodiformate):

(II)

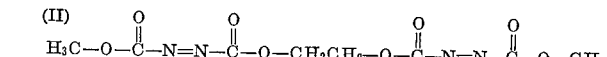

(c) The diesters include polyester condensates from the reaction of the difunctional azodicarboxylic group donor and a difunctional ester group donor. For example, these diesters may be visualized as the polyester condensation products, having at least three azo units, of azodiformic acid and a glycol having 2–4 carbon atoms. The building block repeating unit may be written for the (—$CH_2CH_2$—) ester group as follows:

(III)

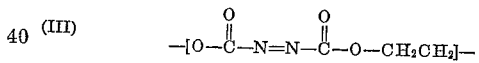

In the polyester product, at least three units are present. The chain length is desirably controlled by introducing into the polyester condensation reaction zone a chain stopper compound which is a donor of a monofunctional ester group either methyl, ethyl, allyl, or halomethyl.

Typical azodiformates are: dimethyl, an orange liquid, d. 190° C.; diethyl, an orange liquid, boils about 240° C.; diallyl, an orange liquid, tends to polymerize on heating; diethylene bis(ethyl azodiformate) a red liquid.

The composition of the invention consists essentially of an intimate mixture of a shock stable material and one or more of the normally shock sensitive diesters defined above, in proportions such that the mixture is shock stable. The mixture may be a solution, i.e., a homogeneous mixture, or a heterogeneous mixture, such as a solid diester mixed with a solid material or coated on the solid material or a liquid diester adsorbed on a solid carrier.

The proportion of material and diester in the composition will be dependent on the diester mainly, the material, and the degree of shock stability desired. Very broadly, a practical degree of shock stability is present when the composition includes the material and the diester in a weight proportion of at least about 15:85, i.e., at least about 15 parts by weight of the shock stable material is present per 100 parts of material plus diester present in the composition.

One embodiment of the composition of the invention utilizes as the shock stable material a liquid solvent for the diester. Any organic liquid which is not shock sensitive and which possessess the requisite solubility in or for the particular diester and does not react therewith may be used, e.g., shock stable azodiformate diesters. Any of the liquids commonly known as organic solvents may be used in the composition of the invention; to illustrate: liquid hydrocarbons-paraffins, cycloparaffins and aromatics— such as pentane, heptane, cyclohexane, benzene and toluene, monohydric alcohols, such as methanol, ethanol, and isopropanol; polyhydric alcohols and ether alcohols; ethers; ketones; halogenated hydrocarbons such as methylene chloride and carbon tetrachloride; heterocyclic solvents such as tetrahydrofuran; the ester solvents such as ethyl acetate.

Especially advantageous solvents are those materials which are plasticizers for one or more of the polymers used in the preparation of cellular bodies. The diester may be conveniently dissolved in the plasticizer used in the preparation of the plastisol to be foamed; this solution is more easily blended into the plastisol and does not require the subsequent removal of solvent. Illustrative plasticizers are: the phthalates: dioctyl, dicapryl, diisodecyl, diallyl, butyl benzyl, and dimethyl Cellosolve; the sebacates: dibutyl, dihexyl, and dioctyl; triethyl citrate; tricresyl phosphate; chlorinated biphenyls; epoxy type plasticizers.

The minimum amount of organic solvent needed to impart a reasonable degree of shock stability to the composition will be dependent mainly on the type of diester. In general, compositions having a minimum degree of hazard are attained with solution weight proportions of solvent to diester of about 25–65: 75–35. At one end of this general range, 25 parts by weight of solvent are present in 100 parts of solvent plus diester; at the other end of the range about 65 parts by weight of solvent are present in 100 parts of solvent plus diester.

Heterogeneous mixtures involving a solid material are effective in producing shock stable compositions. When the diester is a solid, an intimate mixture of finely divided diester solid and finely divided shock stable solid material is desirable. Any solid which is shock stable and inert toward the diester may be used. In some instances the diester may be sufficiently finely divided to form a coating on the larger sized solid material, giving a mixture which does not segregate on storage.

In the case of the liquid diesters it is preferred to adsorb the liquid on a solid carrier; this may be purely surface adsorption on a finely divided solid or it may be adsorption by a porous solid.

Illustrative shock stable solid materials are: silica, silica gel and particularly the silica aerosols; charcoal; carbon black; diatomaceous earth such as kieselguhr; perlite; natural clays such as kaolin, bentonite and fuller's earth; synthetic clays; crystalline porous zeolites; alumina; talc; aluminum silicate; titanium dioxide and calcium carbonate.

As with the liquid solvents, the solid materials are used in at least the amount needed to obtain a reasonably shock stable composition. In general, the solid carrier-diester mixture has weight proportions of solid to diester of about 25–65: 75–35; in other words at one end of the range 25 parts by weight of solid carrier are present for 100 parts of carrier plus diester; at the other end of the range about 65 parts by weight of carrier are present for 100 parts of carrier plus diester.

The solid composition is particularly advantageous in the foaming of polymers which do not require a plasticizer such as rubber and polyethylene. The solid composition is readily milled into the polymer to obtain a uniform dispersion of the composition which uniformity is necessary for the production of a satisfactory cellular structure in the foam.

The composition of the invention includes liquid-liquid or solid-liquid mixture wherein the diester is intimately dispersed through a liquid medium in which the diester is substantially insoluble. Some of the less common plasticizers exhibit low solubility for these diesters; this dispersion composition permits ready milling of the diester into the polymer using this plasticizer. This dispersion composition permits the use of the diester in connection with inorganic liquids such as water.

ILLUSTRATIONS

The invention is illustrated by several compositions. It is to be understood that these illustrative compositions do not limit the scope of the invention.

*Dimethyl azodiformate*

(1) In the standard drop test, a 0.03-milliliter test amount of the dimethyl azodiformate was struck by a 5-kilogram weight in a one-half inch fall. The diester detonated with a very loud report.

(2) Two small drops of this diester were placed in a dish and a flame applied directly thereto. The drops ignited and instantaneously exploded with a loud report. These tests and others establish that this diester is a maximum hazard explosive and therefore barred by ICC regulations from transport by any common carrier.

(3) A solution of 80 weight percent of this diester and 20 weight percent of dioctyl phthalate was prepared. In the drop test, the test sample did not detonate at the 10-inch drop height.

(4) A solution of 85 percent of this ester and 15 percent of benzene was shock stable at the 10-inch height in the drop test.

(5) A solution of 90% of this ester and 10% of methylene chloride was shock stable at the 10 inch height in the drop test.

(6) A solution of 38 percent of this diester in 62 percent of dioctyl phthalate was shock stable in the lead pipe detonation test—giving the same deformation of the pipe as does water in this test.

(7) A 50:50 weight proportion solid mixture of this diester and silica aerosol (Cab-O-Sil) was prepared. This composition was shock stable in both the drop test and the lead pipe detonation test.

(8) A 50:50 weight proportion solid mixture of this diester and diatomaceous earth was prepared. This composition was shock stable in both the drop test and the lead pipe detonation test.

*Diethyl azodiformate*

(9) Diethyl azodiformate was found in the lead pipe detonation test to behave like ammonium nitrate; this makes it an ICC Class A, type 5, explosive.

(10) A solution of 90 weight percent of this diester and 10 weight percent of dioctyl phthalate could not be detonated in the lead pipe detonation test—this solution behaved like water.

(11) A 50:50 weight proportion solid mixture of this diester and Cab-O-Sil silica was shock stable in the lead pipe detonation test.

PREPARATIONS

These diesters can be prepared by several prior art techniques; summaries of which are given in the parent application. A preferred method of preparing dimethyl azodiformate is set out.

*Preparation of dimethyl azodiformate*

The entire reaction for making 454 grams of dimethyl azodiformate was carried out in a 5-liter open top glass reactor kettle that was jacketed for cooling and that was equipped with a bottom drain valve for separating and removing liquid layers. The reactor kettle was charged with a solution containing 105.7 grams of hydrazine in 1500 ml. of water. The solution was cooled to about 10° C. by circulating cold water through the jacket of the reactor. While maintaining efficient stirring the addition of 673 grams of 97.5% pure methyl chloroformate was started. The reaction is exothermic and sufficient cooling was used to maintain a reaction temperature of 10° C.±2° C. When one-half of the methyl chloroformate (336.5 grams) had been added, the addition of 367.6 grams of sodium carbonate powder was begun, simultaneous with the chloroformate. The rate of the sodium carbonate addition was controlled so that the methyl chloroformate addition was completed somewhat in advance of the sodium carbonate addition. A reaction temperature of 10°±2° C. was maintained throughout these additions. The total addition time was about one hour.

After stirring for an additional 15 minutes, 786 ml. of methylene chloride was added. With the reaction mixture maintained at 0–5° C., chlorine gas was admitted to the stirred reaction mixture as fast as it could be completely absorbed. After a total of 258.0 grams of chlorine was admitted, the chlorine addition was discontinued. The reaction mixture was stirred for an additional 10 minutes and then the two layers were allowed to separate.

The lower orange colored methylene chloride layer was drawn off. The aqueous layer was washed with 120 ml. of methylene chloride. This wash layer was drawn off and combined with the first methylene chloride layer. The aqueous layer was discarded. The combined methylene chloride layers were washed with 250 ml. of a 15% sodium chloride solution and then with 500 ml. of a 10% sodium bicarbonate solution. The solution was then dried over anhydrous sodium sulfate and filtered. The methylene chloride solvent was then removed under vacuum (20 mm. of Hg) at 40° C. to obtain 454 grams of dimethyl azodiformate of approximately 97.5% purity.

*Preparation of a bridged diester*

The ester of diethylene glycol with monoethyl azodiformate, or diethylene bis(ethyl azodiformate), was prepared according to the procedure described by N. Rabjohn in the Journal of the America Chemical Society, vol. 70, page 1182 (1948). Diethylene glycol was treated with phosgene to obtain the bis(chloroformate). This product was treated with ethyl carbazate (prepared from diethyl carbonate and 85% hydrazine hydrate) to obtain the diethylene bis(ethyl hydrazodiformate), which subsequently was oxidized with aqueous chlorine to the corresponding azodiester. This diester is a red, clear liquid.

The infrared spectrum and hydrogen iodide titration show that the diester was obtained in quite pure form.

Thus having described the invention, what is claimed is:

1. A shock stable solution composition consisting essentially of inert organic liquid solvent for hereinafter said diester and a normally shock sensitive diester of azoformic acid where the ester groups are selected from the class consisting of methyl, ethyl, allyl, alkylene, oxyalkylene, thioalkylene, said alkylene group having 2–4 carbon atoms; said solvent and said diester being present in weight proportions ranging between about 15:85 and about 65:35.

2. The solution of claim 1 wherein said diester is selected from the class consisting of dimethyl azodiformate, diethyl azodiformate, diethylene bis(ethyl azodiformate), diethylene bis(methylazodiformate).

3. The solution of claim 1 wherein said solvent is selected from the class consisting of methanol, methylene chloride, dioctyl phthalate, dihexyl sebacate and tricresyl phosphate.

4. The solution of claim 1 wherein said proportions are between about 25:75 and about 65:35.

5. A shock stable composition consisting of about 38–80 weight percent of dimethyl azodiformate and about 62–20 weight percent of dioctyl phthalate.

6. A shock stable composition consisting of 10 weight percent of methylene chloride and about 90 weight percent of dimethyl azodiformate.

7. A shock stable composition consisting of about 10 weight percent of dioctyl phthalate and about 90 weight percent of diethyl azodiformate.

References Cited

UNITED STATES PATENTS 2,903,361  9/1959  Marks et al. _____ 260—192 X
2,910,463  10/1959  Urbschat et al. ____ 260—192 X CHARLES B. PARKER, *Primary Examiner.*

F. D. HIGEL, *Assistant Examiner.*